(12) United States Patent
Hughes

(10) Patent No.: US 6,414,456 B1
(45) Date of Patent: Jul. 2, 2002

(54) POSITIONING DEVICE

(75) Inventor: Leon Raymond Hughes, Uxbridge (GB)

(73) Assignee: Brunel University (GB)

( * ) Notice: Subject to any disclaimer, the term of this patent is extended or adjusted under 35 U.S.C. 154(b) by 0 days.

(21) Appl. No.: 09/446,346
(22) PCT Filed: Jun. 16, 1998
(86) PCT No.: PCT/GB98/01748
§ 371 (c)(1), (2), (4) Date: Mar. 15, 2000
(87) PCT Pub. No.: WO98/58205
PCT Pub. Date: Dec. 23, 1998

(30) Foreign Application Priority Data

Jun. 16, 1997 (GB) ............................................. 9712510

(51) Int. Cl.⁷ ................................................. G05B 5/00
(52) U.S. Cl. ....................... 318/445; 318/466; 318/468; 318/480; 318/581; 318/560
(58) Field of Search .................... 318/445, 466, 318/468, 480, 581, 560; 352/243; 396/428

(56) References Cited

U.S. PATENT DOCUMENTS

| | | | | | |
|---|---|---|---|---|---|
| 4,654,703 A | * | 3/1987 | Viera | ...................... | 358/108 |
| 4,699,484 A | * | 10/1987 | Howell et al. | .............. | 352/243 |
| 4,855,838 A | * | 8/1989 | Jones et al. | .................. | 358/229 |
| 5,225,863 A | * | 7/1993 | Weir-Jones | .................. | 354/81 |
| 5,313,378 A | * | 5/1994 | Gordin et al. | .............. | 358/299 |
| 5,425,279 A | * | 6/1995 | Clark et al. | ................ | 73/865.8 |
| 5,425,328 A | * | 6/1995 | Larumbe | .................... | 116/209 |
| 5,579,071 A | * | 11/1996 | Wetzel et al. | ............... | 396/428 |
| 5,982,839 A | * | 11/1999 | Hatley | ........................ | 376/245 |

* cited by examiner

Primary Examiner—Karen Masih
(74) Attorney, Agent, or Firm—Craig A. Fieschko, Esq.; DeWitt Ross & Stevens S.C.

(57) ABSTRACT

A positioning device comprising a securing system for securing equipment thereto. The device may be removably clamped to an elongate support structure, and shifted to different positions on the support structure by remote control.

20 Claims, 3 Drawing Sheets

POSITIONING DEVICE

This invention relates to the positioning of equipment to obtain a positional advantage. Equipment includes, for example, loud speakers, lighting or cameras, and image generating surveillance systems, all of which are controllable from a remote position.

Conventional live image generating surveillance systems include closed circuit television (CCTV) and wireless image information transmission technologies. CCTV systems rely on hard wired networks for the transmission of control and image data over a restricted circuit of cameras and remote viewing or recording means. One feature precluding the portability of this type of system is that the wiring is frequently concealed.

Wireless surveillance systems utilise broadcasting technology to transmit image information from airborne, vehicular or ground mounted camera installations to remote viewing locations. A disadvantage of these prior art systems is that installation is technically challenging and they are expensive. This is particularly so in instances where the camera mounting location is confined or elevated. Cameras are often elevated or otherwise inaccessibly located to protect against sabotage, making repair or maintenance awkward.

The present invention seeks to provide an improved positioning device.

According to an aspect of the present invention there is provided a positioning device comprising a securing system for securing equipment thereto, clamping means for removably clamping the device to an elongate support structure, means for shifting the device between different positions on said support structure, and means for controlling the position of the device on said support structure from a remote location.

The equipment can include a camera, a microphone, a loudspeaker or any other device.

A preferred positioning device is conveniently portable and can be clamped onto an elongate support structure. Such systems provide means of placing equipment in, for example, confined, inhospitable or elevated positions and means for receiving images or other information immediately without complicated installation procedure. Pan, tilt, rotation and axial drive functions can provide a 360° field of motion and can permit easy dispatch and retrieval of the equipment.

An embodiment of the present invention is described below, by way of example only, with reference to the accompanying drawings, in which.

A preferred embodiment of the positioning device comprises two main units, a clamping unit and user remote control unit. The remote control unit has a design which will be apparent to the skilled person from the teachings herein, including controls for moving the device up and down a pole, controls for operating the pan, tilt, and rotate functions and for operating the equipment attached to the device.

Figure 1:
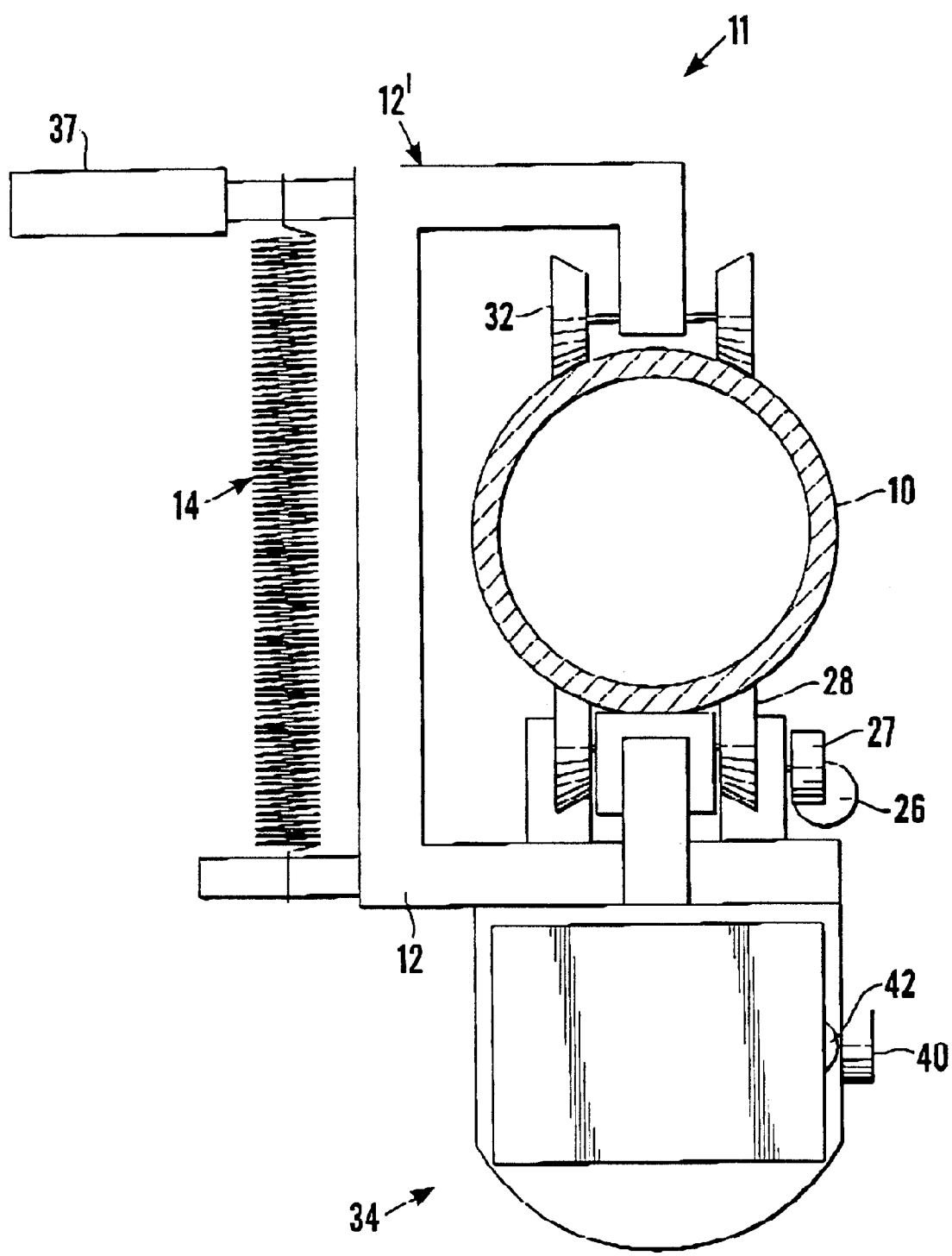
FIG. 1 is a plan view of a preferred embodiment of the positioning device fitted over a post which is shown in cross-section, the equipment and weatherproof protective covers are not shown.
Figure 2:
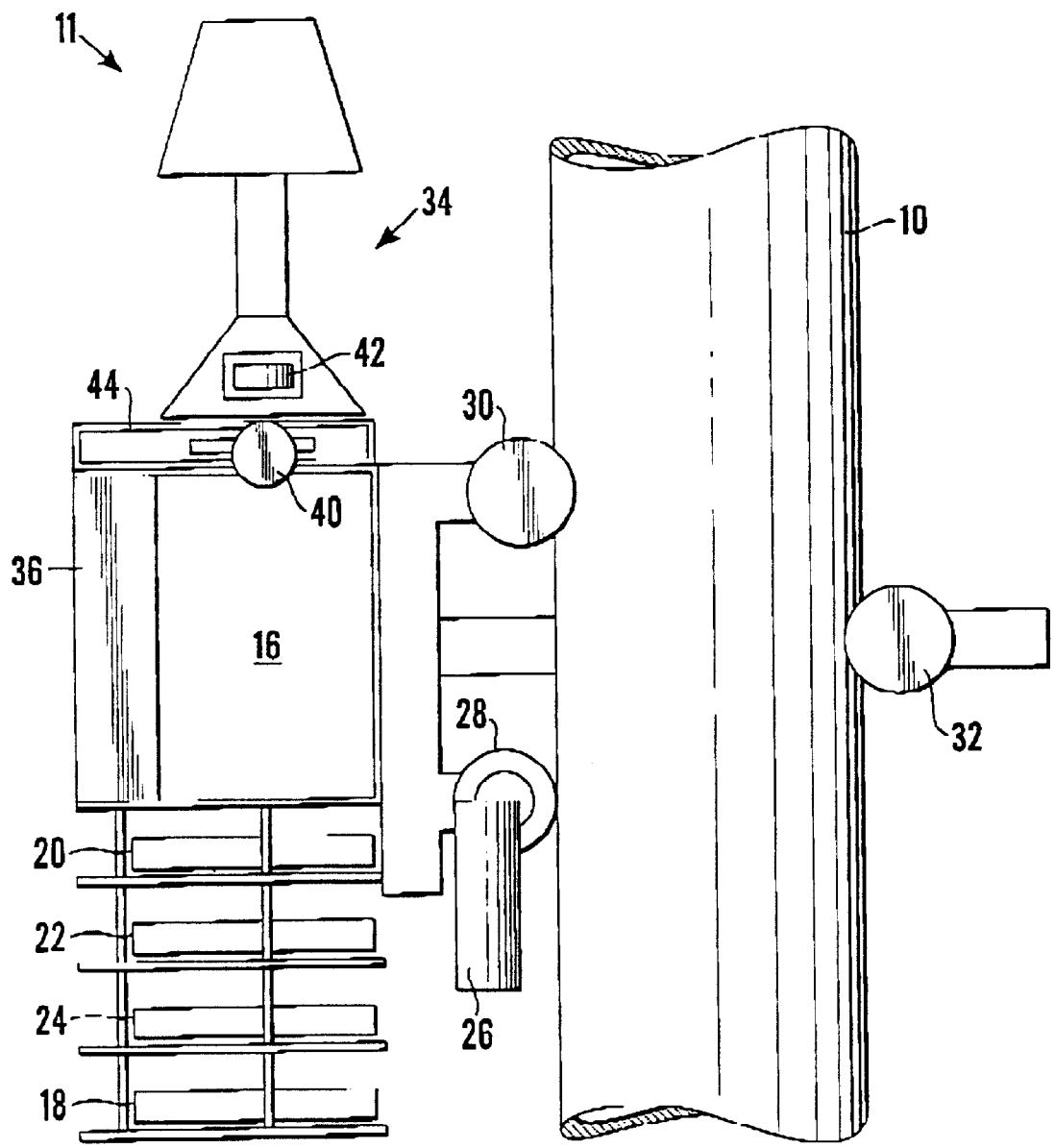
FIG. 2 is a side elevational view of the device of FIG. 1 shown coupled to a vertical post.

The drawings show the positioning device attached to a post 10. With reference to FIGS. 1 and 2 in particular, the clamping unit 11 comprises a resiliently sprung two-part support frame which has a U-shaped cross-section. The frame comprises a metal cast main frame member 12 and sub-frame 12' which are pivotably coupled along a shaft rolling bearing and biased inwards (towards each other) by tensioned springs 14. The clamping unit 11 supports a rechargeable power supply 16, circuit boards 18,20,22,24, driving motor 26, driving wheel 28, guiding wheels 30, 32 and main pan & tilt housings 34. Handles 36 and 37 are provided on the main 12 and sub-frame 12', respectively.

The power supply, which is preferably a 12 v rechargeable battery 16, is housed within a portion of the main frame and is connected to the circuit boards 18,20,22,24, which control the main functions of the positioning device. A first circuit board 18 includes transmitter-receiver means (e.g. an onboard UHF 418 MHz transmitter-receiver module) for sending and receiving signals in the form of radio-waves between a remote control unit (not shown) and the positioning device. As will be apparent to a skilled person, this circuit board will include means for performing digital-to-analogue conversion (and vice versa) for converting between electronic control signals and radio-waves. A second circuit board 20 including a microprocessor (e.g. 74C-type) receives an input from board 18 and controls the time sequences together with all of the operations upon the main device unit. Two further circuit boards 22,24 include respectively relay switches to power the drive 26, pan 40 and tilt 42 motors, and the necessary motor control chip set circuitry.

The drive shaft of the electric motor is coupled to a worm gear which, in turn, engages a sprocket 27. Bearings placed through holes in the frame members support a spindle for the driving wheel 28 which is also coupled to the sprocket 27. The contact surfaces of the driving wheels consist of butal rubber. The pan and tilt unit 34 is equipped with stepper motors 40, 42 and a mechanical transmission mechanism 44. This arrangement is supplied by the same power supply as the main drive motor.

The remote control unit contains a rechargeable power supply and an circuit board containing a microprocessor and a transmitter-receiver module (e.g. UHF 418 MHz transmitter-receiver module). This unit also comprises buttons for selecting individual or groups of operating functions and a joystick.

Figure 3:
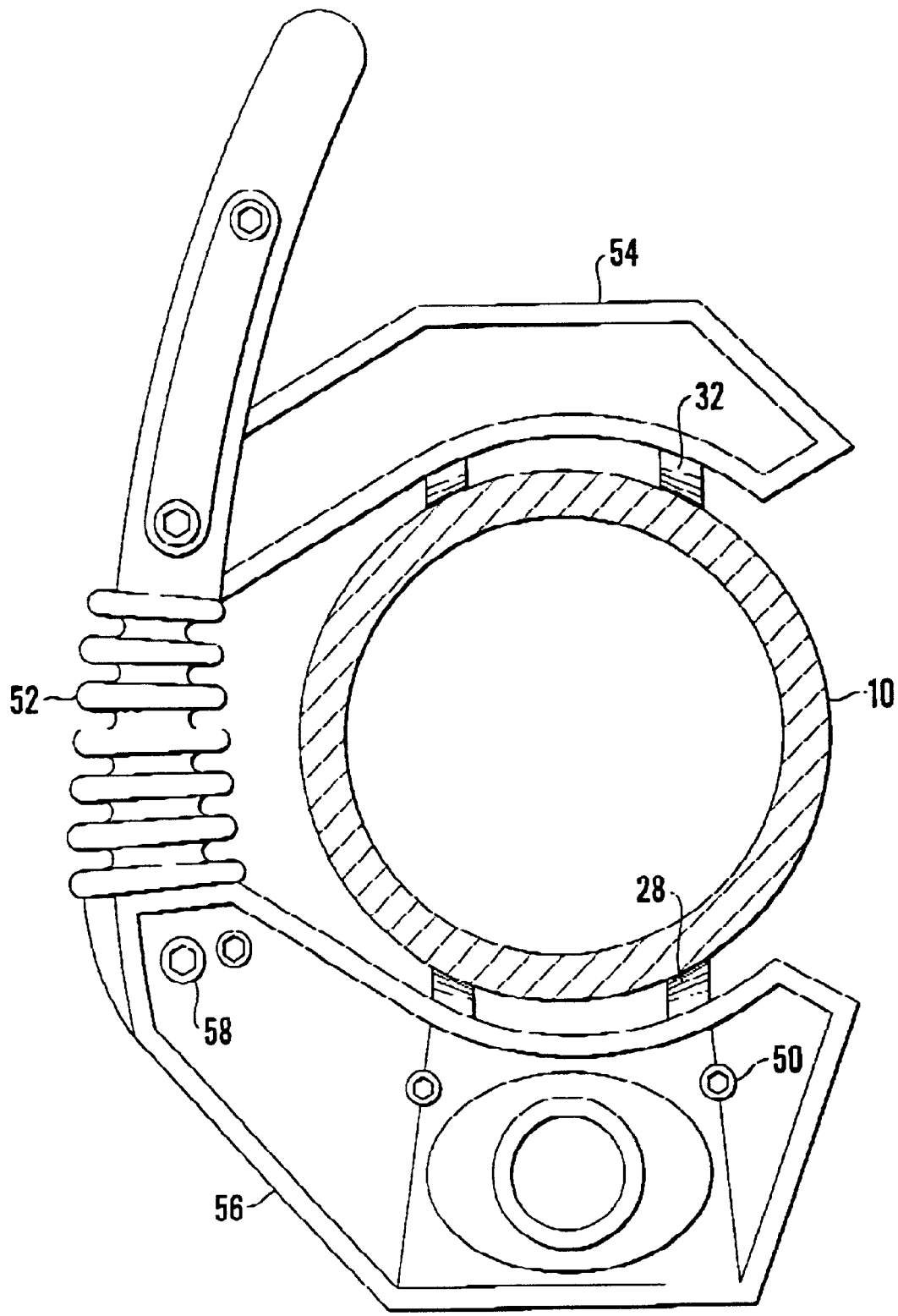
FIG. 3 is a plan view of a preferred positioning device clamped to a post shown in cross-section, the equipment is not shown, weatherproof protective covers are shown.

In general, threaded nylon fittings 50 are used to fixedly attach components to the support frame to prevent corrosion. Springs are concealed by flexible bellows 52 (shown in FIG. 3 only) made from butal rubber which are attached at each end by push-fitting a lip through openings in the surface of the cast frame members 12, 12'. Bearings for rotating parts comprise standard oil-light bushes. They are inserted while the cast is hot so that a tight fit is attained when the structure cools. Weatherproof covers 54,56 (shown in FIG. 3 only) enclose sensitive components by sealing them inside using standard fittings 58 and rubber O-rings (concealed).

When signals from the remote control unit are received by the receiver module on board 18, the unit directs power from the rechargeable battery to the or each motor 26, 40, 42. The torque generated by the driving motor 26 is used to turn the worm gear and the sprocket 27 which, in turn, rotates the driving wheel 28. The worm gear-sprocket arrangement acts as a brake which can prevent the device descending a vertical support structure in the absence of torque from the motor 26. While the worm-gear-sprocket arrangement offers little resistance when turned by the shaft of motor 26, a considerably greater force is required to turn the gear from the sprocket side. Components are selected such that the torque generated by the weight of the unit is too small to turn the wheels from the sprocket side. Hence the unit does not descend.

In use, the positioning device is carried to a desired location where it is clamped to a suitable support means. This may be, for example, a lamp post, mast, pole, railing or pipe line. The fitting/clamping orientation is arbitrary. Clamping the device to the support means involves urging the framework against the sprung biasing means to open it as necessary, placing the unit around the support means and releasing the unit so that it clasps the support means. The system may be powered up from the camera unit or the remote control unit and the operator may leave the immediate vicinity in order to position the device.

From a preferred location and using the buttons and joystick on the user remote control unit, the operator can move the device between desired locations on the support means, for example, in order to raise or lower the device to achieve a positional advantage. The combination of integral features and mechanical transmission means enables the operator to raise, lower, pan, tilt and rotate the device, as well as operate equipment secured thereto. In the case of a camera, focusing means and means for controlling the amount of light entering the camera are also provided. The configuration of the remote control unit permits a selected number of these tasks to be performed simultaneously.

A low battery indicator on the remote control serves to warn the operator if the supply voltage of the power supply on the clamping unit falls below a predetermined threshold.

On completion of the required task, the operator can retrieve the camera unit by returning to the location and lowering the camera unit to the removal point. The device can then be unclasped and removed from the support post.

The preferred device is conveniently portable and can be used on any suitable support means capable of bearing the load. For example, the support means 10 may be fluted, tapered or vary in shape along its length, since the clamping means 11 will adjust itself accordingly. Preferred positioning devices can reach awkward locations without complicated or time consuming installation procedures. They provide a full 360° field of rotation from elevated locations together with easy and rapid access for cleaning and maintenance.

Such systems are useful, for example, in accident and emergency situations where emergency service personnel typically receive instructions from camera-based command stations at a different location.

A skilled person will readily appreciate that several other configurations or modifications may be preferred in certain applications. For example, specific components/features may be omitted, replaced and/or combined. Ancillary equipment may be provided, for example, in a shared housing with the battery 16.

If the operator cannot see the positioning device, it may be desirable to incorporate means which halts the device before it reaches the end of the support. This is achieved, for example, by providing infrared sensors on an arm protruding in front of the unit. In some circumstances, ultrasonic or obstruction sensors may provide useful information relating to height or distance.

The microprocessor upon the clamping unit could be used to count the rotations of the driving wheel and therefore, if the battery was low, the unit could return to its original position where it had been deployed.

One modified version of the device is provided with means for storing and performing programmed sequences of motions.

According to another modified version, the guide wheels are chamfered to abut against different shaped posts. Other modified versions are adapted for use on certain metallic supports; they comprise material with magnetic properties in order to enhance the coefficient of friction between the clamping means and support structure. A number of suitable biasing means can be used as alternatives to conventional springs.

Larger embodiments require stronger materials, stronger fixing means, durable components, more resiliently biased means together with larger power supplies. In such cases, metallic components are frequently preferred and may require protection from corrosion by, for example, cadmium coating.

According to another modified version, the two part frame and/or weatherproof covers can be constructed from suitable plastics materials, thereby permitting manufacture by injection moulding techniques and use of fixing means other than nylon threaded components.

In other modified embodiments, different transmitter-receiver modules may be preferred, depending on considerations such as bandwidth regulations, interference levels and the nature of the specific application.

In cases where the equipment includes video camera means, the video transmission method may be modified. For example, it may be based on microwave technology (e.g. Heletele), mobile phone technology, laser or infrared light transmission, or the like.

More unusual types of equipment will be preferred in certain applications. Alternatives include image intensifying equipment for poor light conditions, thermal imaging cameras for heat sensing applications such as searches and pursuits, and underwater cameras. In some applications still cameras actuated by timers or sensors may be preferred.

RastaVision is one interesting development in CCTV surveillance technology. RastaVision provides a camera with a 360° lens that is software controlled eliminating the need for pan and tilt units. Another modification would be to replace the pan and tilt unit with a rastacamera for surveillance purposes.

The invention is also directed to a method by which the described apparatus operates and includes method steps for carrying out every function of the apparatus.

What is claimed is:

1. A positioning device comprising securing means for securing equipment thereto, adjustable clamping means for removably clamping the device to a support structure, mean for shifting between different positions on the support structure, a brake able to hold the device in position on a vertical support structure, and means for adjusting the position of the device on a support structure from a remote location.

2. A device according to claim 1, where the adjustable clamping means comprises support structure gripping means which are resiliently biased towards each other.

3. A device according to claim 2, wherein the support structure gripping means comprise a drive wheel and one or more guide wheels adapted to grip the surface of the support structure.

4. A device according to claim 3, wherein each wheel comprises an elastomeric outer layer and/or comprises an inner material having magnetic properties.

5. A device according to claim 4, wherein the means for shifting between different positions on the support structure includes a worm gear-sprocket arrangement disposed between an electric motor and the drive wheel.

6. A device according to claim 5, comprising electronic control means operable to control the electric motor including means for communicating with a remote unit for sending and receiving control signals.

7. A device according to claim 6, wherein said electronic control means and said remote unit comprise means for transmitting and receiving radio-waves.

8. A device according to claim 6, wherein said control signals relate to one or more of the following:

(a) the position and/or direction of motion of the positioning device on the support structure;

(b) the orientation or operation of equipment secured to the positioning device.

9. A device according to claim 8, wherein there is provided means for panning, tilting and rotating equipment secured to the device.

10. A device according to claim 1, wherein the means for shifting between different positions on the support structure includes a worm gear-sprocket arrangement disposed between an electric motor and the drive wheel.

11. A device according to claim 10, comprising electronic control means operable to control the electric motor including means for communicating with a remote unit for sending and receiving control signals.

12. A device according to claim 11, wherein said electronic control means and said remote unit comprise means for transmitting and receiving radio-waves.

13. A device according to claim 11, wherein said control signals relate to one or more of the following:

(a) the position and/or direction of motion of the positioning device on the support structure;

(b) the orientation or operation of equipment secured to the positioning device.

14. A device according to claim 13, wherein there is provided means for panning, tilting and rotating equipment secured to the device.

15. A device according to claim 3, wherein the means for shifting between different positions on the support structure includes a worm gear-sprocket arrangement disposed between an electric motor and the drive wheel.

16. A device according to claim 15, comprising electronic control means operable to control the electric motor including means for communicating with a remote unit for sending and receiving control signals.

17. A device according to claim 16, wherein said electronic control means and said remote unit comprise means for transmitting and receiving radio-waves.

18. A device according to claim 16, wherein said control signals relate to one or more of the following:

(a) the position and/or direction of motion of the positioning device on the support structure;

(b) the orientation or operation of equipment secured to the positioning device.

19. A device according to claim 18, wherein there is provided means for panning, tilting and rotating equipment secured to the device.

20. A positioning device comprising securing means for securing equipment thereto, adjustable clampins means for removably clamping the device to a support structure means for shifting between different positions on a support structure and means for adjusting the position of the device along a support structure from a remote location, characterised in that the adjustable clamping means includes a plurality of clamp members designed substantially to envelop a support structure which is substantially in axial cross-section.

* * * * *